US005497421A

United States Patent [19]
Kaufman et al.

[11] Patent Number: 5,497,421
[45] Date of Patent: Mar. 5, 1996

[54] METHOD AND APPARATUS FOR PROTECTING THE CONFIDENTIALITY OF PASSWORDS IN A DISTRIBUTED DATA PROCESSING SYSTEM

[75] Inventors: Charles W. Kaufman, Northboro; Morrie Gasser, Hopkinton; Butler W. Lampson, Cambridge; Joseph J. Tardo, Concord; Kannan Alagappan, Cambridge, all of Mass.

[73] Assignee: Digital Equipment Corporation, Maynard, Mass.

[21] Appl. No.: 314,181

[22] Filed: Sep. 28, 1994

Related U.S. Application Data

[63] Continuation of Ser. No. 875,050, Apr. 28, 1992, Pat. No. 5,418,854.

[51] Int. Cl.[6] .................................................. H04K 1/00
[52] U.S. Cl. ........................... 380/23; 380/21; 380/25; 380/28; 380/30
[58] Field of Search .......................... 395/800; 380/23, 380/25, 30, 21

[56] References Cited

U.S. PATENT DOCUMENTS

| | | | |
|---|---|---|---|
| 4,399,323 | 8/1983 | Henry | 178/22.14 |
| 4,881,264 | 11/1989 | Merkle | 380/25 |
| 4,885,777 | 12/1989 | Takaragi et al. | 380/30 |
| 4,924,515 | 5/1990 | Matyas et al. | 380/25 |
| 4,932,056 | 6/1990 | Shamir | 380/23 |
| 4,993,068 | 2/1991 | Piosenka et al. | 380/23 |
| 5,018,196 | 5/1991 | Takaragi et al. | 380/30 |
| 5,032,987 | 7/1991 | Broder et al. | 395/421.11 |
| 5,121,494 | 6/1992 | Dias et al. | 395/600 |
| 5,201,000 | 4/1993 | Matyas et al. | 380/30 |
| 5,297,206 | 3/1994 | Orton | 380/30 |
| 5,315,658 | 5/1994 | Micali | 380/30 |
| 5,365,589 | 11/1994 | Gutowitz | 380/43 |

OTHER PUBLICATIONS

Article entitled, "SPX: Global Authentication Using Public Key Certificates" by J. J. Tardo et al. from Proceeding of IEEE Symp. Research in Security and Privacy, IEEE CS Press, 1991, at pp. 232–244.

Article entitled, "Authentication for Distributed Systems" by T. Y. C. Woo et al., University of Texas at Austin, from Computer, IEEE Computer Society, Jan. 1992, at pp. 49–51.

Article entitled, "Reducing the Risks from Poorly Chosen Keys" by T. Mark et al., University of Cambridge Computer Laboratory Cambridge, England, from 12th Symposium on Operating System Principles 1989 at pp. 14–18.

*Primary Examiner*—Alyssa H. Bowler
*Assistant Examiner*—John Follansbee
*Attorney, Agent, or Firm*—Cesari and McKenna

[57] ABSTRACT

Apparatus for protecting the confidentiality of a user's password during a remote login authentication exchange between a user node and a directory service node of a distributed, public key cryptography system includes a specialized server application functioning as an intermediary agent for the login procedure. The login agent has responsibility for approving the user's login attempt and distributing a private key to the user. However, the login agent is not trusted with the user's password and is therefore a "semi-trusted" node. In another aspect of the invention, a login protocol enables remote authentication of the user password without transmitting the password over the network.

7 Claims, 5 Drawing Sheets

METHOD AND APPARATUS FOR PROTECTING THE CONFIDENTIALITY OF PASSWORDS IN A DISTRIBUTED DATA PROCESSING SYSTEM

This is a continuation of U.S. patent application Ser. No. 07/875,050, filed on Apr. 28, 1992 now U.S. Pat. No. 5,418,854.

FIELD OF THE INVENTION

This invention relates generally to distributed data processing systems and, more specifically, to a method and apparatus for protecting the confidentiality of user passwords in a distributed dam processing system employing public key cryptography for authentication.

BACKGROUND OF THE INVENTION

A password is a special sequence of characters that uniquely "authenticates", i.e., confirms a user's identity, to a computer system and that is used for security purposes to control access to information and operations of the computer. Specifically, each user of the system is associated with an "account" that includes access rights to the computer's resources. In addition, each account has a name and a password, the latter being known only to the user authorized to access the account. Passwords are typically assigned to accounts as they are created, although many systems allow the users to change their passwords to any sequence of characters they desire.

When allowed to select their own passwords, users tend to choose passwords that are easily remembered; unfortunately, these passwords may also be easily guessed. One common threat to a password-based authentication system is an impostor capable of guessing the password of an authorized user. With the use of an automated system configured to generate character sequences at a high rate, the impostor can quickly "guess" large numbers of common names and words, typically by replaying every word in a dictionary. This is called a "dictionary attack".

In a stand-alone computer, the operating system has the responsibility for authenticating users. That is, upon presentation of a valid user's password during a login procedure, the operating system verifies the identity of the user by checking the presented password against a list of valid passwords. This type of authentication procedure may prevent a dictionary attack because, after a certain number of wrong guesses, the operating system can disable the account being attacked. Such an attack is, however, difficult to prevent in a distributed data processing network if there is no centralized intermediary that can observe the guesses.

A distributed network system typically includes various computer nodes interconnected by a communications medium. In many distributed systems, the user must send a password to each remote node in order to access its resources. If the user has the same password on all systems, the local node can save the entered password and automatically send it to the remote nodes when needed. In any case, this type of "remote" authentication is susceptible to another common, password-based system threat known as eavesdropping, i.e., interception of the password by wiretapping the network. If successful, eavesdropping can permit impersonation of the user by means of the intercepted password. To counter such a threat, cryptography is often used to preserve the confidentiality of the transmitted password when authenticating the user to remote nodes.

A third threat to a password-based authentication system is the penetration of a node that stores each authorized user's password for the purpose of authenticating each user to the system. Here, successful penetration of the node will allow the intruder to learn the passwords of all users. This threat can also be addressed with cryptography, although it is not always possible to protect against each threat in a single system.

The computer nodes described herein may include nodes that are directly accessed by users, e.g., workstations, and nodes running specialized applications, e.g., servers. These nodes, the processes running on these nodes and the users of the distributed system are called "principals". The authentication exchange described herein is performed on behalf of the principals.

A well-known cryptographic technique used to perform remote authentication is public key cryptography. In this method of secure communication, each principal has a public encryption key and a private encryption key, and two principals can communicate knowing only each other's public keys. An encryption key is a code or number which, when taken together with an encryption algorithm, defines a unique transformation used to encrypt or decrypt dam. A public key system may be used in such a way as to ensure confidentiality of the information being transmitted, i.e., to ensure that the information may not be understood by an eavesdropper, as well as to ensure the authenticity of the sender of the information. The specific public key technique described herein is an RSA encryption scheme. It will, however, be understood to those skilled in the art that other public key systems may be used.

According to this type of encryption, the private key is known only to the owner of the key, while the public key is known to other principals in the system. Public key cryptography is also called "asymmetric" encryption because information encoded with one of the key pair may be decoded only by using the other key in the pair. With RSA crytpography, a principal's public and private keys are selected such that the transformations that they effect are mutual inverses of each other and the sequential application of both transformations, in either order, will first encode the information and then decode it to restore the information to its original form.

Accordingly, to effect a secure transmission of information to a recipient, a principal encodes ("encrypts") the information with the recipient's public key. Since only the intended recipient has the complementary private key, only that principal can decode ("decrypt") it. On the other hand, to prove to a recipient of information that the sender is who he purports to be, the sender encodes ("signs") the information with its private key. If the recipient can decode ("verify") the information, it knows that the sender has correctly identified itself.

Operation of a public key cryptography system will now be described with reference to an illustrative login authentication exchange between a workstation, acting on behalf of a user, and a remote server. Such operation may be understood without reference to the specific transformations that are used for encryption and decryption. Basically, the workstation encrypts a message for confidentiality by performing a transformation using the server's public key, and the server de, crypts the message by performing a transformation using its private key.

Specifically, a user logs into the workstation with the user's password and the workstation derives a secret, non-complementary, encryption key by applying a known hash algorithm to the password. The workstation then requests the user's private key from a directory service of the remote server. The user's private key has previously been encrypted under the same secret encryption key and stored as a "credential" in the directory. A credential is a table entry comprising the user's name and the user's private RSA key; in other words, the credential is a representation of the user in the computer. The remote server returns the encrypted private key to the workstation, which uses the secret key to decrypt and obtain the private key.

In this password-based authentication system, the encrypted private key is transmitted over the network from the directory server to the workstation. Since knowledge of the password is not needed to initiate the request, an impostor can easily request a copy of the encrypted message. Equipped with a copy of the encrypted message, the impostor can attempt to decrypt the message by guessing various passwords and hashing them with the known hash-code algorithm to form the secret key. In other words, the impostor need only request the encrypted message once and, thereafter, it can continuously attempt to decipher the message on its own computer without the risk of being audited or detected. The impostor knows it has successfully derived the secret key and decrypted the message if the decrypted result yields an intelligible, valid private key. An impostor that can demonstrate possession of the private key may thus across system resources on behalf of the user.

A solution to this problem has been proposed using public key cryptography to enhance the security of a system that is primarily based on secret key authentication. This system employs a method to ensure that the contents of messages exchanged over the network are unintelligible to an impostor, even if the impostor has correctly decrypted a captured message. According to the method, the workstation generates a random bit string to which is concatenated a hash-coded version of the user's password. This quantity is encrypted under the authentication server's public key and forwarded, together with the username, as a message to the authentication server. The authentication server decrypts the message with its private key and checks that the workstation supplied the correct hash total for the user's password. If so, the server creates a ticket for the user and performs a boolean (exclusive-OR) function on the ticket and the random bit string. The result of this latter operation is encrypted under the user's password hash value and returned as a message to the workstation. Since the impostor does not know the random bit string, it cannot distinguish between successful and unsuccessful decryptions of the message. This is because there is no information in a successfully decrypted message that would provide the impostor with information that the decryption was successful.

It is apparent from the description above that the authentication server of the secret key system must have knowledge of the user's password. If the authentication server is compromised, it could use its knowledge of the password to impersonate the user. It is a significant advantage of a public key cryptography system that only the user has access to the user's private key. Yet, the lack of a trusted, on-line agent to oversee the login process makes the public key distributed system particularly vulnerable to a dictionary attack. The present invention is directed to the password guessing problem in a public key environment and provides the same degree of security against the dictionary attack as the above-described secret key system without revealing the private key to any other party.

SUMMARY OF THE INVENTION

The present invention resides in a method and related apparatus for protecting the confidentiality of a user's password during a remote login authentication exchange between a user node, such as a workstation, and a directory service node of a distributed, public key cryptography system. Specifically, in one aspect of the invention, a specialized server application functions as an intermediary agent for the login authentication procedure. This "semi-trusted" login agent (LA) has responsibility for approving the user's login attempt and distributing the private key to the user. However, the LA is not trusted with the user's password and, thus, cannot impersonate the user. This latter condition is ensured by a novel login protocol which, in another aspect of the invention, enables remote authentication of the user password without transmitting the password over the network, as described below.

When the user is first registered in the data processing system, a specialized server application called a "key generator" (KG) accepts a password from the user and generates a private/public RSA key pair for the user. Two hash totals, H1 and H2, of the password are then computed by the KG using two different, known algorithms. The user's private RSA key U is encrypted under H1 to form an "encrypted credential", $\{U\}H_1$. This credential is appended to H2 and the result is encrypted under the public key of the LA, $\{\{U\}H_1, H2\}_{LA\text{-}PUB}$. The resulting, doubly-encrypted credential is stored under the user's name in the directory of a certificate storage server (CSS).

When logging into the system, the user enters its name and password at a workstation. In accordance with the novel login protocol, the workstation calculates $H1_A$ and $H2_A$ of the password using the same algorithms employed by the KG; the workstation then generates a secret key K comprising a random nonce. K and $H2_A$ are then encrypted under the public key of the LA, $\{K, H2\}_{LA\text{-}PUB}$, and forwarded, along with the user's name, to the LA as a message M, i.e., $M=\{H2_A, K\}_{LA\text{-}PUB}$, username.

The LA decrypts M using its private key and temporarily stores $H2_A$ and K; the LA then forwards the username to the CSS node, which searches for the name in its directory service. Upon location of the username, the CSS obtains the associated doubly-encrypted credential and forwards it to the LA.

The LA decrypts the doubly-encrypted credential with its own private key to obtain H2 and the encrypted credential, $\{U\}H_1$. The $H2_A$ value received from the workstation is then compared to the H2 value extracted from the doubly-encrypted credential. If the hash totals are not equal, the LA does not return the information; more specifically, the LA records the failed attempt and, after some number of failed attempts, may lock the account prior to terminating the login procedure. If the hash totals match, the LA encrypts the encrypted credential with K, $\{\{U\}H1\}_K$, and returns this modified encrypted credential to the workstation. The workstation decrypts the modified credential with its stored K and then decrypts the resulting encrypted credential with $H1_A$ to obtain the user's private RSA key U.

An advantage of this invention is that dictionary attacks are deterred by the unique arrangement described herein because the user's private RSA key is not revealed to any other party and, hence, may not be acquired by eavesdropping. In addition, the use of two separate hash functions, the first not derivable from the second, eliminates the requirement for a "trusted", on-line intermediary agent having knowledge of the user's password. The on-line intermediary agent disclosed herein is thus trusted only to avoid carrying out a dictionary attack itself and acquires no information that would enable it to compromise or impersonate the user.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
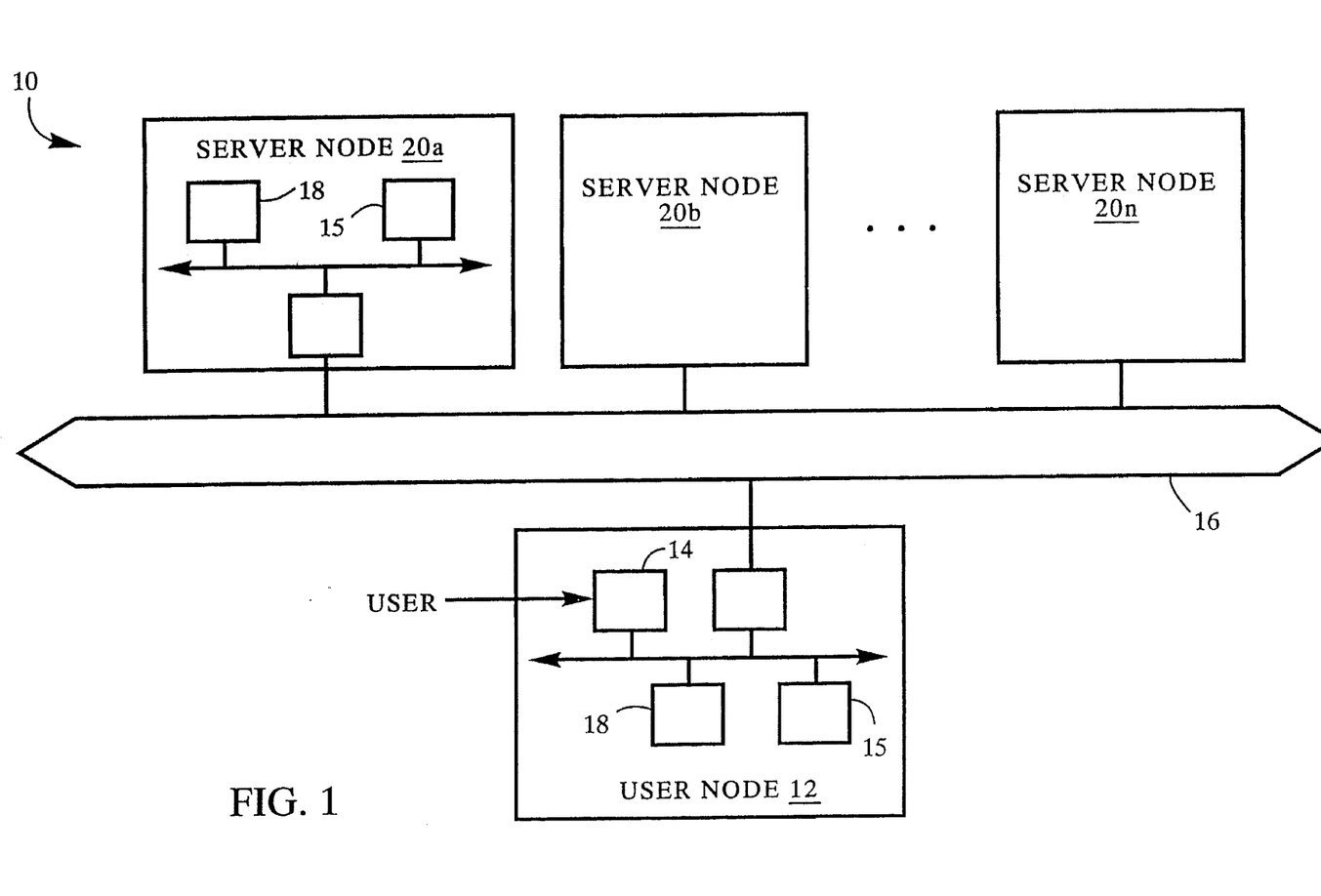
FIG. 1 is a diagram of a distributed data processing network system in which the apparatus and protocol of the invention may be used.

Referring to FIG. 1, a distributed, public key data processing network system 10 includes a plurality of computer nodes, such as a user node 12 and various server nodes 20a–n, interconnected by a communications medium 16. The user node, e.g., a workstation 12, is a computer generally configured for use by one user at a time, whereas each server 20 is a computer resource running specialized software applications, typically for use by many users. In general, each of the computer nodes includes memory means 15 for storing software programs and data structures associated with the RSA cryptographic methods and techniques described herein. In addition, the nodes further include processor means 18 for executing the software programs, including various algorithms for generating numbers and codes associated with, e.g., passwords, and for manipulating the stored data structures. It will be apparent to those skilled in the art that other processor and memory means, such as encoding and decoding devices, may be used within the teachings of the invention to implement the RSA cryptographic methods and techniques. An example of these devices is disclosed in U.S. Pat. No. 4,405,829 titled, Cryptographic Communications System and Method, by Rivest et al., which patent is hereby incorporated by reference as though fully set forth herein.

To access the server nodes 20 of the network 10, a user typically "logs in" to the local workstation 12 and then remotely authenticates itself to those nodes. Specifically, the user types an authorized name and password into an input/output device 14 of the workstation 12 and the workstation initiates a novel login exchange protocol to authenticate the login attempt using the login authentication arrangement described below. Once authenticated, the user receives its private RSA key, which the workstation 12 uses in subsequent authentication protocols.

Figure 2:
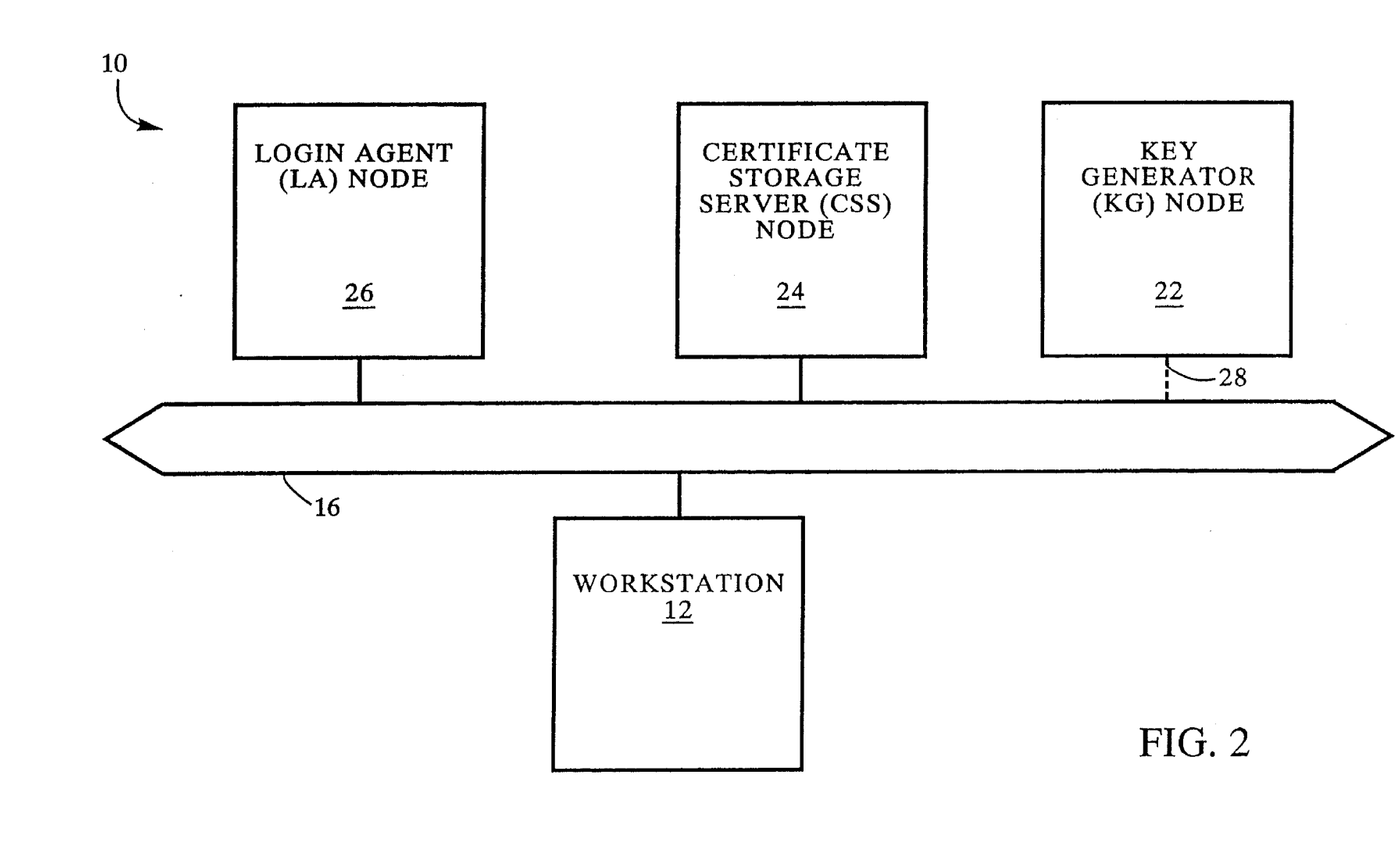
FIG. 2 is an exemplary embodiment of a login authentication arrangement including a workstation node, a key generator (KG) node, a certificate storage server (CSS) node and a login agent (LA) node in accordance with the invention.

An exemplary embodiment of the login authentication arrangement is shown in FIG. 2. The arrangement includes a key generator (KG) server 22, a certificate storage server (CSS) 24 and a login agent (LA) server 26. The LA 26 is a specialized server application used primarily to approve a user's login attempt and provide the user with an encrypted copy of its private RSA key while, in accordance with a feature of the invention, making off-line password guessing attacks difficult. Because the private key is encrypted, the LA cannot access its contents and thus has no "knowledge" of the key; therefore, the login agent may be configured as a "semi-trusted" authority.

The KG 22 is a specialized server application used to register a user in the distributed system 10 by creating an account that includes the user's name and password. The KG 22 also creates a private/public RSA key pair KG must choose private/public key pairs at random and must either generate or accept from the users the keys or the passwords used to encrypt the private keys. In addition to reliably generating and encrypting the private keys, the trusted KG 22 is required to "forget", i.e., erase, the private keys. Further, in most implementations, the KG must reliably communicate the generated public key to a "certification authority" (CA), so that the CA may cryptographically bind the public key and the user name in a signed "certificate". One way of securing the KG is to physically package it with the CA and keep the node off the network when not in use, as illustrated by the dotted line 28.

The CSS 24 functions as a repository for storing and distributing authentication information, such as public key certificates and encrypted, "long-term" credentials, the latter being representations of principals in a computer. The encrypted credential includes the principal's identity as well as the principal's private RSA key. Because the stored private key is encrypted, the CSS need not he a trusted authority. However, encryption prevents the key from being directly read by impostors, thereby deterring off-line password guessing attach.

In an alternate embodiment of the authentication arrangement, the CSS 24 and the LA 26 may be combined into a single entity. Yet, in accordance with the exemplary embodiment of the invention described below, the CSS and LA are separate nodes. The CSS 24 is accessed at registration to store a user's long-term credential in a database directory and is thereafter accessed at login by the workstation 12 to retrieve that credential for authentication purposes, as described below.

Account Creation

Figure 3:
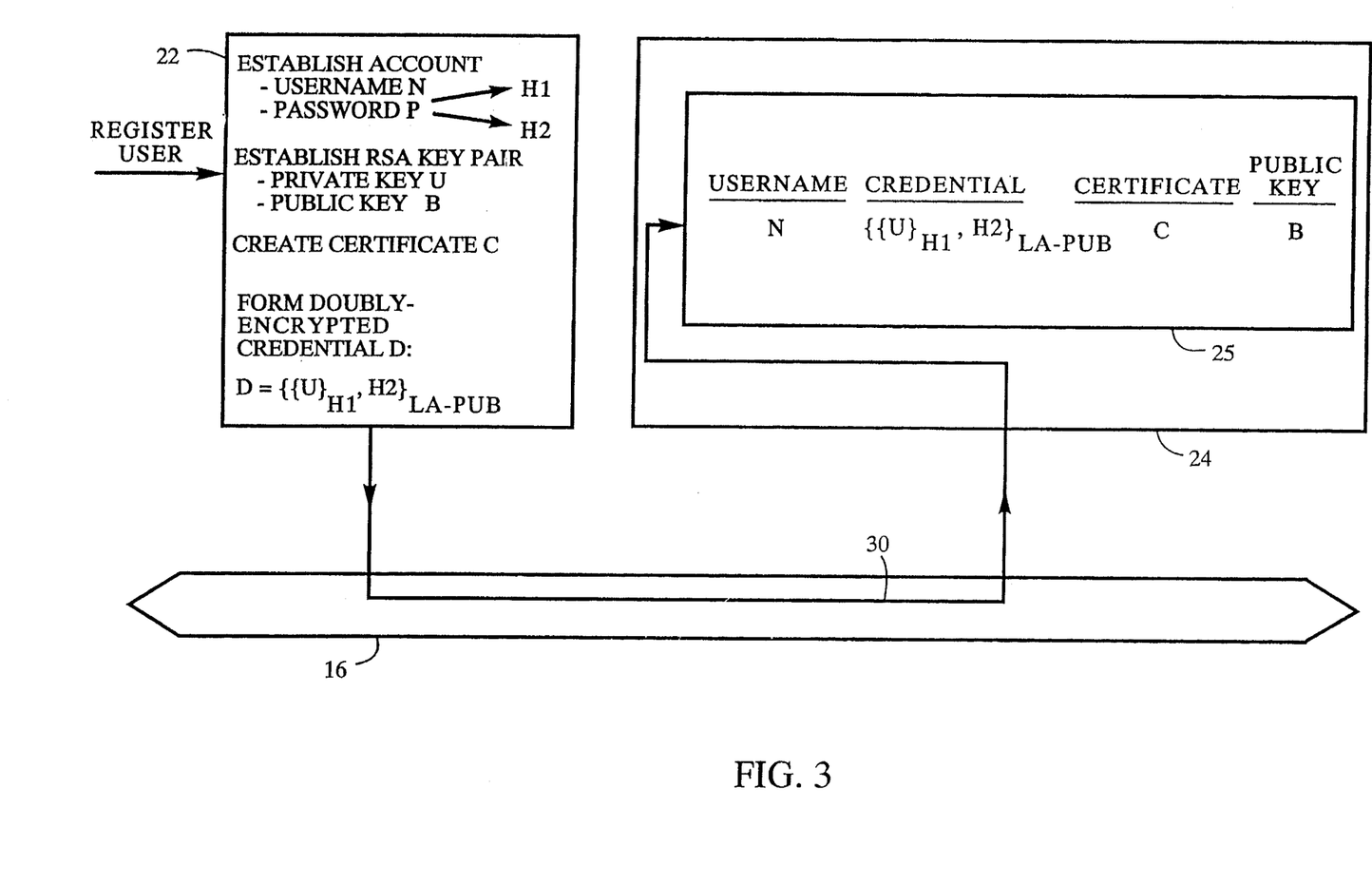
FIG. 3 depicts the apparatus and protocol for registering a user in the distributed network system.

FIG. 3 shows the apparatus and protocol for registering a user in the network system 10. Initially, the KG 22 establishes an account, including a password P and a username N, and a private RSA key U/public RSA key B pair for the user. As noted, the CA creates and signs a certificate C which associates the corresponding public key B with the user. The KG 22 then computes two hash totals, H1 and 112, of the password using two different algorithms. HI may be derived from any conventional hash function that transforms a password into a secret key, e.g., a data encryption standard (DES) key, while H2 is preferably derived from any conventional one-way hash function. In accordance with the teachings of the invention, knowledge of H2 is insufficient to gain knowledge of H1 or the password.

With H1, the KG 22 encrypts the user's private RSA key U, thus forming an encrypted credential", i.e., $\{U\}_{H1}$, which protects the confidentiality of U. This also protects U from exposure due to eavesdropping since, at this time, H1 is not stored at any other location in the network. The encrypted credential is appended to H2, and the result is encrypted under the public key PUB of the LA 26 to form a "doubly-encrypted" credential D:

$$D = \{\{U\}H_1, H2\}_{LA\text{-}pUB}$$

The username N, the certificate C, the doubly-encrypted credential D and the user's public key B are transferred (at reference 30) to the CSS 24 and stored in its database directory service 25 under the username N. It should be noted that for the alternate authentication embodiment comprising a combined CSS and LA entity, the encrypted credential need not be further encrypted under LA-PUB when stored in the database 25 because access to the database directory service is controlled by the combined entity. This completes the KG's involvement with the login authentication process.

It should also be noted that the user's private RSA key U is not known to the CSS 24 because the CSS does not have access to H1 or LA-PRIV and because both keys are needed to decrypt U. Also, the hash totals H1 and H2 are computed using different algorithms, so one total cannot be derived from the other. This means that compromising the non-trusted CSS 24 does not compromise any of the private keys stored therein.

As noted, users need their private keys to authenticate using public key-based mechanisms. In order to retrieve the encrypted private key U from the CSS 24, the workstation 12 must present evidence to the LA 26 that it has the correct user's password. This evidence is presented during the login procedure. Furthermore, the evidence must be conveyed to the LA 26 without transmitting the password over the network 10. This latter condition is satisfied by a novel login authentication protocol wherein the workstation 12 establishes a communication channel with the LA 26 and persuades the login agent that it is whom it purports to be.

Logging-In

Figure 4:
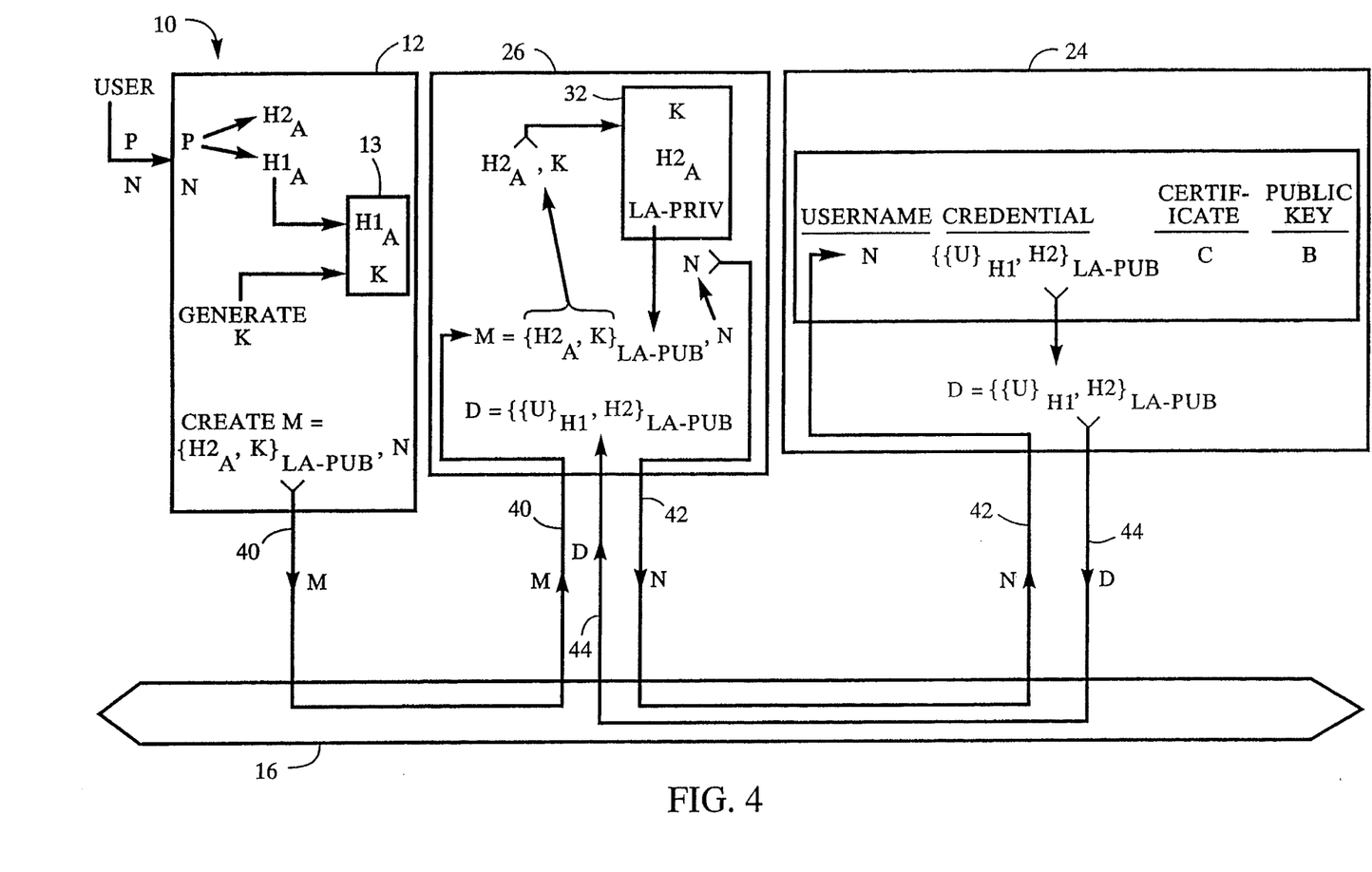
FIGS. 4 and 5 depict the novel login authentication apparatus and protocol in accordance with the invention.
Figure 5:
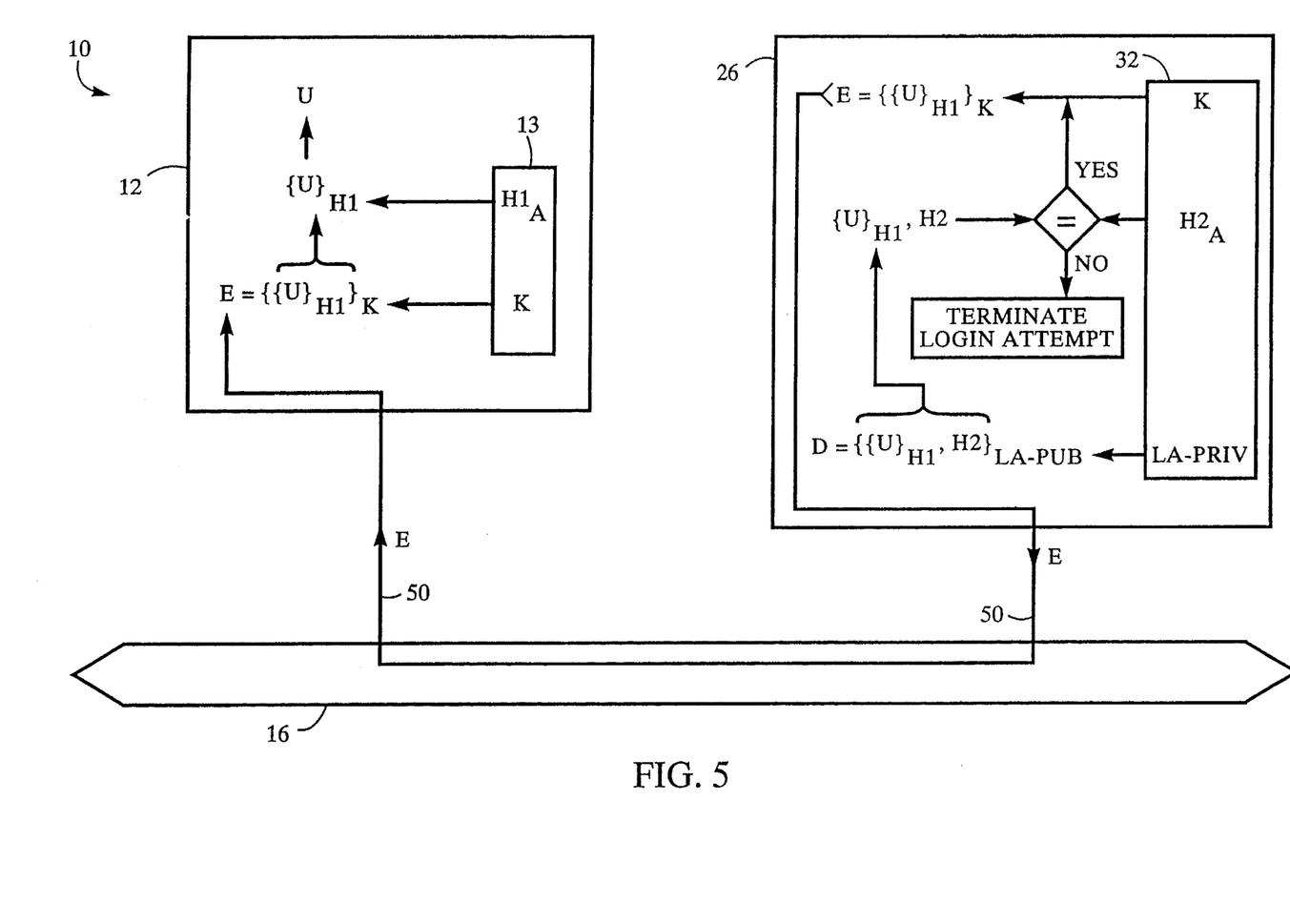

FIGS. 4 and 5 illustrate the novel login authentication apparatus and protocol, including preliminary computations performed by the local workstation 12 as depicted in FIG. 4. To access resources throughout the distributed network system 10, the user need only "log-in" to the workstation 12 by entering his/her username N and password P.

The workstation 12 then computes two hash totals from the password, $H1_A$ and $H2_A$, using the same algorithms used by the KG 22 to compute H1 and H2. At this time, the workstation also generates a random, secret nonce key K for use when the LA 26 delivers the user's encrypted private key U; $H1_A$ and K are then stored in a local buffer 13. To ensure their confidentiality, $H2_A$ and K are encrypted by the workstation 12 under the LA's public key LA-PUB and then transmitted (at reference 40), along with the username N, to the LA as a message M:

$$M=\{H2_A, K\}_{LA\text{-}PUB}, N$$

Upon reception of M, the LA 26 parses the username N, decrypts the encrypted portion of the message M using its private key and temporarily stores $H2_A$ and K in a local buffer 32. The LA's private key is also stored in the buffer 32. The LA then forwards (at reference 42) the username N to the CSS 24, which searches for the name in its directory service 25. Upon locating N, the CSS 24 obtains the associated doubly-encrypted credential D and forwards it (at reference 44) to the LA 26. As noted, D contains the user's private RSA key U encrypted with H1, {U}H1; this quantity is appended to H2 and further encrypted under the LA's public key, $\{\{U\}_{H1}, H2\}_{LA\text{-}PUB}$, to prevent comprehension by arbitrary users.

Referring to FIG. 5, the LA 26 decrypts D with its own private key to obtain the encrypted credential {U}$H_1$ and to obtain H2. The LA then compares $H2_A$ received from the workstation to H2 extracted from D. If the hash totals do not match, the LA 26 does not return any further information and may audit the unauthorized user's login attempt, depending on local policy. In any event, the LA 26 terminates the login procedure. If a match ensues, it is apparent that the workstation 12 is in valid possession of the user's password; therefore, the LA 26 encrypts the encrypted credential with K to form a modified encrypted credential E, i.e., $E=\{\{U\}_{H1}\}_K$, and then forwards E (at reference 50) to the workstation 12.

The workstation decrypts E with the secret nonce key K stored in the buffer 13 and then decrypts the resulting encrypted credential with $H1_A$ to obtain the user's private key U. $H1_A$ is equal to H1 because it has already been established that the entered password was correct. With possession of its key U, the workstation can now participate in public key-based authentication protocols on behalf of the user.

Although the apparatus and protocol described herein does not prevent password guessing, it ensures that the guessing is "on-line" where it can be observed by the LA 26. This is because the LA must be contacted every time a user is authenticated during a login procedure. The novel login authentication arrangement set forth herein thus enables implementation of various security policies involving audits and "break-in" detection.

Furthermore, the novel arrangement is based on a public key system, as opposed to a secret key system, thus eliminating the need for an on-line, key distribution server that is "trusted" with knowledge of the user's private key U. This, in turn, reduces the possibilities of impersonating the login agent.

The foregoing description has been directed to a specific embodiment of this invention. It will be apparent, however, that variations and modifications may be made to the described embodiment, with the attainment of some or all of its advantages. Therefore, it is the object of the appended claims to cover all such variations and modifications as come within the true spirit and scope of the invention.

What is claimed is:

1. In a public key, distributed data processing network system including a plurality of nodes interconnected by a communications medium, an arrangement for authenticating a user to said network using a password and username entered during a login procedure, and comparing the information indicative of the password with information contained in a doubly-encrypted credential which is stored in a network database, said arrangement comprising:

A. a user node which receives a password and a username during login and computes first and a second hash totals from the password using a first and a second hash algorithm, respectively, and generates a nonce key, and encrypts said second hash total and said nonce key using a first public key to create an encrypted message;

B. a login agent node, comprising

B1. means for receiving and decrypting said encrypted message using a first private key to obtain said second hash total and said nonce key;

B2. means for receiving said d-ably-encrypted credential which contains (i) an encrypted credential formed by encrypting a user private key with a first stored hash total computed from the password, and (ii) a second stored hash total computed from the password, wherein said encrypted credential and said second stored hash total are appended and encrypted by said first public key to form the doubly encrypted credential;

B3. metres for decrypting said doubly-encrypted credential using said first private key to obtain said encrypted credential and said second stored hash total, for comparing said second stored hash total with said second hash total to determine if said password entered by the user is correct, for encrypting said encrypted credential with said nonce key when said second stored hash total and said second hash total match to create a return message, and for forwarding said return message to said user node; and wherein said user node comprises means responsive to said return message, for decrypting said return message using said nonce key to obtain said encrypted credential, and for decrypting said encrypted credential with said first hash total to obtain said private key.

2. The arrangement of claim 1 wherein said user node includes a memory for storing cryptographic programs and a processor for executing said programs to decrypt said encrypted credential and to acquire said private key.

3. The arrangement of claim 1, wherein said login agent node further comprises:
   B4. means for recording a login failure if said second stored hash total does not equal said second hash total.

4. In a public key, distributed data processing network system including a plurality of nodes interconnected by a communications medium, an arrangement for authenticating a user to said network using a password and username entered during a login procedure, said arrangement comprising:
   A. a user node which receives a password and a username during login and computes first and a second hash totals from the password using a first and a second hash algorithm, respectively, and generates a nonce key, and encrypts said second hash total and said nonce key using a first public key to create an encrypted message;
   B. a certificate storage server node which includes a database containing a plurality of doubly encrypted credentials each uniquely associated with a particular system user, wherein each of said doubly encrypted credentials contains (i) an encrypted credential formed by encrypting a user private key with a first stored hash total computed from the password, and (ii) a second stored hash total computed from the password, wherein said encrypted credential and said second stored hash total are appended and encrypted by said first public key to form said doubly encrypted credential;
   C. a login agent node, comprising
      C1. means for receiving and decrypting said encrypted message using a first private key to obtain said second hash total and said nonce key;
      C2. means for receiving said doubly-encrypted credential which is associated with the particular user attempting to login;
      C3. means, for decrypting said doubly-encrypted credential using said first private key to obtain said encrypted credential said said second stored hash total, for comparing said second stored hash total with said second hash total to determine if the password is correct, encrypting said encrypted credential with said nonce key when said second stored hash total and said second hash total are equal to create a return message and for forwarding said return message to said user node; and wherein said user node comprises means responsive to said return message, for decrypting said return message using said nonce key to obtain said encrypted credential, and for decrypting said encrypted credential with said first hash total to obtain said private key, to allow the user to participate in public key based authentication over the network.

5. The arrangement of claim 4, wherein said login agent node further comprises:
   C4. means for recording a login failure if said second stored hash total does not equal said second hash total.

6. In a public key, distributed data processing network system including a plurality of nodes interconnected by a communications medium, an arrangement for authenticating a user to said network using a password and username entered during a login procedure, said arrangement comprising:
   A. a user node which receives a password and a username during login and computes first and a second hash totals from the password using a first and a second hash algorithm, respectively, and generates a nonce key, and encrypts said second hash total and said nonce key using a first public key to create an encrypted message;
   B. a certificate storage server node which includes a database containing a plurality of doubly encrypted credentials each uniquely associated with a particular system user, wherein each of said doubly encrypted credential contains (i) an encrypted credential formed by encrypting a user private key with a first stored hash total computed from the password, and (ii) a second stored hash total computed from the password, wherein said encrypted credential and said second stored hash total are appended sad encrypted by said first public key to form said doubly encrypted credential;
   C. a login agent node which receives said encrypted message and said doubly-encrypted message, and decrypts said encrypted message using a first private key to obtain said second hash total and said nonce key, and decrypts said doubly-encrypted credential using said first private key to obtain said encrypted credential and said second stored hash total and compares said second stored hash total with said second hash total to determine if the user has entered the proper password, and the hashing totals are equal encrypting said encrypted credential with said nonce key to create a return, message which is forwarded to said user node; and wherein said user node comprises means responsive to said return message, for decrypting said return message using said nonce key to obtain said encrypted credential, and for decrypting said encrypted credential with said first hash total to obtain said private key, to allow the user to participate in public key based authentication over the network.

7. The arrangement of claim 6, wherein said login agent node further comprises means for recording a login failure if said second stored hash total does not equal said second hash total.

* * * * *

UNITED STATES PATENT AND TRADEMARK OFFICE
CERTIFICATE OF CORRECTION

PATENT NO. : 5,497,421
DATED : Mar. 5, 1996
INVENTOR(S) : Charles W. Kaufman, et al It is certified that error appears in the above-indentified patent and that said Letters Patent is hereby corrected as shown below:

On the cover page, *add a notice regarding the terminal disclaimer* filed during the prosecution of this application. The applicant disclaimed the terminal part of the above identified patent which would extend beyond the expiration date of the full statutory term of United States Patent 5,418,854.

Column 4, line 35, delete "usemarne" and insert --username--;

Column 6, line 4, after "pair" insert --for the user and, thus, must operate in a trustworthy fashion, that is, the--;

Column 6, line 43, delete "112" and insert --H2--; and

Column 7, line 42, delete "$^N$" and insert --N--.

UNITED STATES PATENT AND TRADEMARK OFFICE
CERTIFICATE OF CORRECTION

PATENT NO. : 5,497,421
DATED : Mar. 5, 1996
INVENTOR(S) : Charles W. Kaufman, et al It is certified that error appears in the above-indentified patent and that said Letters Patent is hereby corrected as shown below:

<u>In the Claims:</u>

Column 8, line 51, delete "d-ably" and insert --doubly--;

Column 8, line 60, delete "metres" and insert --means--;

Column 9, line 51, delete the first occurrence of "said" and insert --and--;

Column 9, line 54, after "correct," insert --for--; and

Column 10, line 47, after "return" delete the comma.

Signed and Sealed this

Fourth Day of June, 1996

Attest:

BRUCE LEHMAN

Attesting Officer

Commissioner of Patents and Trademarks